United States Patent
Sun et al.

(10) Patent No.: US 12,173,224 B2
(45) Date of Patent: Dec. 24, 2024

(54) SODIUM ALKYL PG-DIMONIUM CHLORIDE PHOSPHATES AS LUBRICATING AGENTS IN AQUEOUS BASED DRILLING FLUIDS

(71) Applicant: Colonial Chemical, Inc., South Pittsburg, TN (US)

(72) Inventors: Xiangdong Sun, South Pittsburg, TN (US); David Anderson, Jr., South Pittsburg, TN (US); Robert N. Comber, South Pittsburg, TN (US); John W. Baxter, South Pittsburg, TN (US)

(73) Assignee: Colonial Chemical, Inc., South Pittsburg, TN (US)

( * ) Notice: Subject to any disclaimer, the term of this patent is extended or adjusted under 35 U.S.C. 154(b) by 488 days.

(21) Appl. No.: 17/633,316

(22) PCT Filed: Aug. 5, 2020

(86) PCT No.: PCT/US2020/045052
§ 371 (c)(1),
(2) Date: Feb. 7, 2022

(87) PCT Pub. No.: WO2021/026262
PCT Pub. Date: Feb. 11, 2021

(65) Prior Publication Data
US 2022/0282147 A1    Sep. 8, 2022

Related U.S. Application Data

(60) Provisional application No. 62/883,039, filed on Aug. 5, 2019.

(51) Int. Cl.
*C09K 8/035* (2006.01)
*C09K 8/03* (2006.01)
*C09K 8/04* (2006.01)

(52) U.S. Cl.
CPC .............. *C09K 8/035* (2013.01); *C09K 8/032* (2013.01); *C09K 8/04* (2013.01)

(58) Field of Classification Search
CPC .......... C09K 8/035; C09K 8/032; C09K 8/04; C09K 2208/32; C10M 137/06; C10M 2201/02; C10M 2201/081; C10M 2223/10; C10M 173/02; C10N 2030/06
See application file for complete search history.

(56) References Cited

U.S. PATENT DOCUMENTS

| | | | |
|---|---|---|---|
| 2005/0054540 A1* | 3/2005 | Patel | C09K 8/18 507/128 |
| 2008/0096782 A1* | 4/2008 | Nguyen | A61K 8/922 510/119 |
| 2014/0378550 A1* | 12/2014 | Grundhofer | A61K 8/416 514/643 |

FOREIGN PATENT DOCUMENTS

WO   WO-2008007059 A1 *  1/2008  .......... A61K 8/0208

\* cited by examiner

*Primary Examiner* — Kumar R Bhushan
(74) *Attorney, Agent, or Firm* — Stites & Harbison PLLC; Richard S. Myers, Jr.

(57) ABSTRACT

An aqueous based drilling fluid that exhibits improved lubricity, containing a phospholipid lubricant component and methods of improving the lubricity of an aqueous based drilling fluids. The methods include improving the lubricity of an aqueous based drilling fluid composed of an aqueous base fluid, and a weighting agent, with the addition of an effective amount of a phospholipid to substantially reduce the coefficient of friction when compared to the fluid absent the phospholipids.

13 Claims, No Drawings

SODIUM ALKYL PG-DIMONIUM CHLORIDE PHOSPHATES AS LUBRICATING AGENTS IN AQUEOUS BASED DRILLING FLUIDS

PRIOR APPLICATIONS

This application claims priority from International Patent Application No. PCT/US2020/45052, filed Aug. 5, 2020, which claims benefit to U.S. Provisional Application No. 62/883,039 filed Aug. 5, 2019, the entire disclosures of which are incorporated herein by this reference.

FIELD OF THE INVENTION

The present invention relates to various lubricating agents. Additionally, the present invention relates to methods of improving the lubricity of an aqueous based drilling fluid composed of an aqueous base fluid, and a weighting agent. The method involves the addition of an effective amount of a sodium alkyl PG-dimonium chloride phosphate phospholipid agent of the present invention to a drilling fluid to substantially reduce the coefficient of friction when compared to the fluid absent the phospholipids.

Various brines, including clear brines are often used in the drilling of subterranean wells during the penetration of the target formation and are often called completion fluids. Brine based drilling muds are also well known to one of skill in the art of drilling. Unfortunately, many if not all of the known lubricants useful in aqueous based drilling fluids are not compatible with clear brines or drilling muds that have brine as a major component. Thus, there remains an unmet need for a lubricant for brine-based drilling fluids especially clear brines. The present invention meets that need.

SUMMARY OF THE INVENTION

Embodiments of the present invention include methods of improving the lubricity of an aqueous based drilling fluids. The methods include improving the lubricity of an aqueous based drilling fluid composed of an aqueous base fluid, and a weighting agent, with the addition of an effective amount of a phospholipid of the present invention to substantially reduce the coefficient of friction when compared to the fluid absent the phospholipids.

Embodiments of the present invention also include aqueous based drilling fluids. An illustrative drilling fluid comprises an aqueous base fluid, a weighting agent, and an effective amount of a phospholipid of the present invention. The weighting agent can be a water soluble salt selected from at least one of alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds well known to one of skill in the art.

In one embodiment, the phospholipid compounds of the present invention, as supplied, have the generalized molecular structure of:

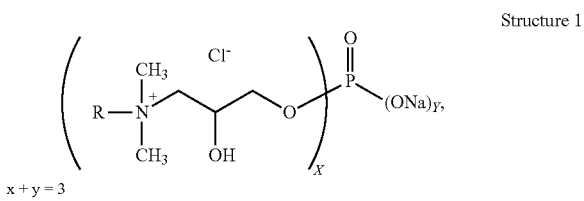

Structure 1

$x + y = 3$ wherein: R is a $C_6$-$C_{25}$ hydrocarbon group. It is recognized that when in formulation the counterions present in the phospholipid may exchange with counterions of other ingredients, for example, the conjugate bases of a strong inorganic acid or organic acid.

Thus, alternatively, in formulation, the phospholipid may be of the following formula:

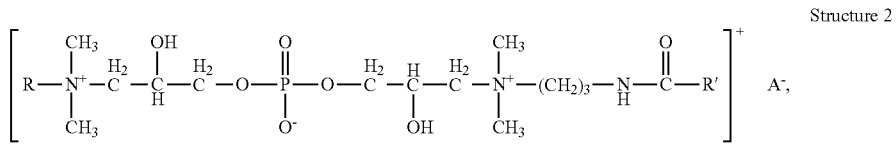

Structure 2 wherein R and R' are independently $C_6$-$C_{25}$ hydrocarbon groups and A is any suitable anion to counter the cationic charge, preferably a conjugate base of a strong inorganic acid or organic acid. Preferably, the anion is selected from the group consisting of halide, nitrate, sulfate, phosphate, anions of $C_1$ to $C_{10}$ organic acids, and combinations of these. In another preferred and illustrative embodiment, the phospholipids includes one or more fatty acid amidopropyl propylene glycol dimonium phosphate salt in which the fatty acid is a $C_{10}$-$C_{25}$ fatty acid.

In some embodiments, the other counterions/anions in formulation can be selected from the group consisting of halide, nitrate, sulfate, phosphate, anions of $C_1$-$C_{10}$ organic acids, and combinations of these.

In embodiments of the present invention, the phospholipid includes one or more fatty alkyl propylene glycol dimonium phosphate salt in which the fatty alkyl group is a $C_6$-$C_{25}$ alkyl group.

In another embodiment of the present invention, the phospholipid compounds of the present invention are sodium alkyl PG-dimonium chloride phosphates sold by Colonial Chemical, Inc., South Pittsburg, TN.

Optionally, the drilling fluid may further include such conventional components such as a solid weighting agents, fluid loss control agents, viscosifiers, and the like which should be well known to one of skill in the art of drilling fluid formulation.

The present invention also includes methods of drilling a subterranean formation utilizing an aqueous based drilling fluid of the present invention. An illustrative drilling fluid of the present invention comprises an aqueous base fluid, with a phospholipid compound of Structure 1.

The improvement in lubricity is achieved by adding an effective amount of one or more phospholipid compounds of the present invention to substantially reduce the coefficient of friction when compared to the fluid absent the phospholipids.

In one such illustrative embodiment, the phospholipids compounds, as supplied, have the generalized molecular structure: In one embodiment, the phospholipid compounds of the present invention, as supplied, have the generalized molecular structure of:

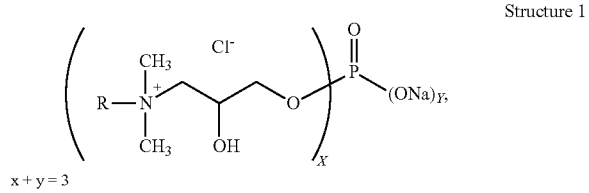

Structure 1

$x + y = 3$ wherein: R is a $C_6$-$C_{25}$ hydrocarbon group. It is recognized that when in formulation the counterions present in the phospholipid may exchange with counterions of other ingredients, for example, the conjugate bases of a strong inorganic acid or organic acid.

Thus, alternatively, in formulation, the phospholipid may be of the following formula:

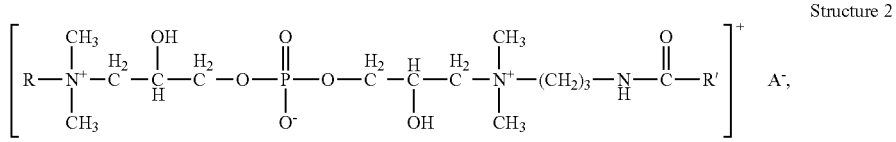

Structure 2 wherein R and R' are independently $C_6$-$C_{25}$ hydrocarbon groups and A is any suitable anion to counter the cationic charge, preferably a conjugate base of a strong inorganic acid or organic acid. Preferably, the anion is selected from the group consisting of halide, nitrate, sulfate, phosphate, anions of $C_1$ to $C_{10}$ organic acids, and combinations of these. In another preferred and illustrative embodiment, the phospholipids includes one or more fatty acid amidopropyl propylene glycol dimonium phosphate salt in which the fatty acid is a $C_{10}$-$C_{25}$ fatty acid.

Further, it should be appreciated that the present invention may also include a brine-based drilling fluid exhibiting increased lubricity as compared to a conventionally formulated drilling fluid. In one embodiment of the present invention, the brine based drilling fluid includes an aqueous base fluid, composed of an aqueous base fluid, and a weighting agent, with a compound of Structure 1. The water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds. The improved fluid includes an effective amount of one or more phospholipid compounds of the present invention, which substantially reduce the coefficient of friction when compared to the fluid absent the phospholipids.

Thus, embodiments of the present invention include an improved aqueous, brine based drilling fluid. Embodiments also include methods of improving the lubricity of an aqueous based drilling fluid. Embodiments also include methods of drilling a subterranean formation utilizing the improved, aqueous, brine based drilling fluid of the present invention.

DESCRIPTION OF THE INVENTION

Embodiments of the present invention are directed to a water-base drilling fluid for use in drilling wells. Generally the drilling fluid of the claimed subject matter may be formulated to include an aqueous continuous phase, a weighting agent and a lubricant/lubricating agent as disclosed herein. The drilling fluids of the claimed subject matter may optionally include additional components, such as viscosity agents, fluid loss control agents, bridging agents, anti-bit balling agents, corrosion inhibition agents, alkali reserve materials and buffering agents, surfactants and suspending agents, rate of penetration enhancing agents and the like that one of skill in the art should understand may be added to an aqueous based drilling fluid.

Embodiments of the present invention are directed to a lubricant/lubricating agent that is compatible with aqueous based drilling fluids, especially brackish water field brines. The lubricant/lubricating agents of the present invention include the phospholipids of the current invention.

In embodiments of the invention, the lubricant should be stable up to temperatures of 200° F. and give lubricity values greater than 25% and preferably greater than 35% reduction compared to untreated brines. In addition the lubricant should exhibit a minimal amount or tendency to grease, "cheese", foam, or emulsify when added to the brine.

The aqueous based continuous phase may generally be any water based fluid phase that is compatible with the formulation of a drilling fluid and is compatible with the lubricants disclosed herein. In one preferred embodiment, the aqueous based continuous phase is selected from: fresh water, sea water, brine, mixtures of water and water soluble organic compounds mixtures of water and water soluble organic compounds, and mixtures thereof. The amount of the aqueous based continuous phase should be sufficient to form a water based drilling fluid. This amount may range from nearly 100% of the drilling fluid to less than 30% of the fluid by volume. Preferably, the aqueous based continuous phase is from about 95 to about 30% by volume and preferably from about 90 to about 40% by volume of the drilling fluid.

A lubricant of the current invention is included in the formulation of the drilling fluids of the claimed subject matter so that there is substantive reduction in the friction of the drill string. Thus, the lubricant should be present in sufficient concentration to reduce either or both the friction between the drilling string and the walls of the wellbore. The exact amount of the lubricant present in a particular drilling fluid formulation can be determined by a trial and error method of testing the combination of drilling fluid and lubricant and the reduction in friction achieved. Generally however, the lubricant of the claimed subject matter may be used in drilling fluids in a concentration from about 0.01 to about 20 pounds per barrel (lbs/bbl or ppb) and more preferably in a concentration from about 0.1 to about 10 pounds per barrel of drilling fluid.

The drilling fluids of the claimed subject matter include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled. Weight materials suitable for use in the formulation of the drilling fluids of the claimed subject matter may be generally selected from any type of weighting materials be it in a solid particulate form, suspended in solution, dissolved in the aqueous phase as part of the preparation process or added afterward during drilling. In one illustrative embodiment, the weight material may be selected from the group including barite, hematite, iron oxide, calcium carbonate, magnesium carbonate, aqueous soluble organic and inorganic salts, and mixtures and combinations of these compounds and similar such weight materials that may be utilized in the formulation of drilling fluids. The weighting agent is a salt which can be a water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds well known to one of skill in the art.

The drilling fluids of the claimed subject matter can optionally include a viscosifying agent in order to alter or maintain the rheological properties of the fluid. The primary purpose for such viscosifying agents is to control the viscosity and potential changes in viscosity of the drilling fluid. Viscosity control is particularly important because often a subterranean formation may have a temperature significantly higher than the surface temperature. Thus a drilling fluid may undergo temperature extremes of nearly freezing temperatures to nearly the boiling temperature of water or higher during the course of its transit from the surface to the drill bit and back. One of skill in the art should know and understand that such changes in temperature can result in significant changes in the rheological properties of fluids. Thus in order to control and/or moderate the rheology changes, viscosity agents and rheology control agents may be included in the formulation of the drilling fluid. Viscosifying agents suitable for use in the formulation of the drilling fluids of the claimed subject matter may be generally selected from any type of viscosifying agents suitable for use in aqueous based drilling fluids. In one illustrative embodiment, an optional viscosifying agent is included in the drilling fluid and the viscosifying agent can be selected mixtures and combinations of compounds that should be known to one of skill in the art such as xanthan gums, starches, modified starches and synthetic viscosifiers such as polyarcylamides, and the like.

In addition to the components noted above, the claimed drilling fluids may also be formulated to include materials generically referred to as alkali reserve and alkali buffering agent, gelling materials, thinners, and fluid loss control agents, as well as other compounds and materials which are optionally added to water base drilling fluid formulations. Of these additional materials, each can be added to the formulation in a concentration as rheologically and functionally required by drilling conditions.

One of skill in the art should appreciate that lime is the principle alkali reserve agent utilized in formulating water based drilling fluids. Alkali buffering agents, such as cyclic organic amines, sterically hindered amines, amides of fatty acids and the like may also be included to serve as a buffer against the loss of the alkali reserve agent. The drilling fluid may also contain anticorrosion agents as well to prevent corrosion of the metal components of the drilling operational equipment. Gelling materials are also often used in aqueous based drilling fluids and these include bentonite, sepiolite, clay, attapulgite clay, anionic high-molecular weight polymers and biopolymers. Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the claimed subject matter that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment of the invention, the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

Other additives that could be present in the drilling fluids of the claimed subject matter include products such as penetration rate enhancers, defoamers, fluid loss circulation products and so forth. Such compounds should be known to one of ordinary skill in the art of formulating aqueous based drilling fluids.

The drilling fluids of the present invention may be used as described in U.S. Pat. No. 7,094,738, incorporated herein by reference in its entirety.

EXAMPLES

The following is presented for exemplary purposes only. The Examples and exemplary formulations are not intended to be construed as limiting the present invention.

Testing and Results

Phospholipids of the current invention with structures, depicted above as Structure 1, were evaluated for their ability to improve the lubricity of aqueous based drilling compositions. The Coefficient of Friction (CoF) & Percent Torque Reduction values for fluids containing the phospholipids of the invention were determined by incorporating water dispersible drilling lubricants of the current invention in various brine formulations. Standard testing procedures using an OFITE Digital Lubricity Meter (OFI Testing Equipment, Houston, TX) were followed in these studies. This lubricity tester is used to measure the lubricating quality of drilling fluids, provide data to evaluate the type and quantity of lubricating additives that may be required, and predict wear rates of mechanical parts in known fluid systems. The procedure used is designed to simulate the speed of rotation of the drill pipe and the pressure with which the pipe bears against the wall of a bore hole. For the standard lubricity coefficient test, 150 in-lb of torque force (the equivalent of 5,000 to 10,000 psi pressure on the intermediate fluid) is applied to two hardened steel surfaces, a block and a ring rotating ring at 60 rpm. Test concentrations were chosen to be 0.6% by volume of test substance (Lubricant A) and demonstrate the effectiveness of the phospholipids of the present invention at low concentrations. The data in Table 1 was generated using a Coco-based phospholipid (Structure 1, where R=Coco derived, C6-C14 alkyl). Test Lubricant A was evaluated at 0.6% by volume, or 0.05 weight % active). Table 1 summarizes both the comparison of coefficient of friction results as well as the torque reduction results for Lubricant A in various brine formulations. The percent torque reduction is calculated by comparing the difference between the CoF of the test substance (Lubricant A) in the brine solutions and the CoF of the brine solutions only as a % of the CoF of neat brines and sea water.

TABLE 1

Summary of Coefficient of Friction data and Torque Reduction data for Lubricant A measured at 72° F. for 5 minutes

| | Brine Only CoF | 0.6% Lubricant A CoF | Torque Reduction % |
|---|---|---|---|
| Seawater ASTM D1141 | 0.36 | 0.05 | 86% |
| Seawater + 3% KCl | 0.37 | 0.04 | 89% |
| 9.0 ppg KCl | 0.38 | 0.03 | 92% |
| 10.0 ppg NaCl | 0.37 | 0.07 | 81% |
| 10.7 ppg CaCl$_2$ | 0.26 | 0.09 | 65% |
| 11.6 ppg CaCl$_2$ | 0.09 | 0.07 | 22% |
| 11.2 ppg CaCl$_2$/CaBr$_2$ | 0.11 | 0.05 | 54% |
| 12.2 ppg CaBr$_2$ | 0.15 | 0.07 | 53% |

As shown above, lubricant A and other phospholipids of the current invention significantly reduce the coefficient of friction in seawater, sodium chloride, sodium bromide, calcium chloride, and calcium bromide drilling or completion fluids.

As used herein, the singular forms "a," "an" and "the" include plural referents unless the context clearly dictates otherwise. Thus, for example, reference to "a surfactant" includes mixtures of two or more such surfactants.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein.

Unless otherwise indicated, all numbers expressing quantities of ingredients, properties such as reaction conditions, and so forth used herein are to be understood as being modified in all instances by the term "about." Accordingly, unless indicated to the contrary, the numerical parameters set forth in the herein are approximations that may vary depending upon the desired properties sought to be determined by the present invention.

All publications mentioned herein are incorporated herein by reference in their entirety to disclose and describe the methods and/or materials in connection with which the publications are cited.

We claim:

1. An aqueous based drilling fluids, comprising:
an aqueous base fluid;
a weighting agent; and
a phospholipid compound of the following formula:

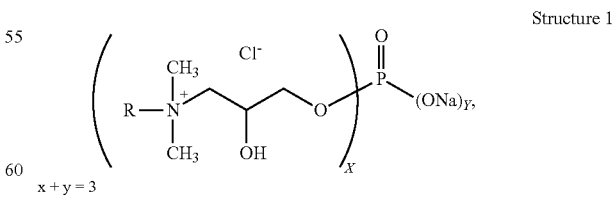

Structure 1

$x + y = 3$ wherein: R is a C6-C25 hydrocarbon group; and wherein when in formulation the counterions present in the phospholipid may exchange with counterions of other ingredients.

2. The drilling fluid of claim 1, further comprising an anion for the phospholipid compound selected from halide, nitrate, sulfate, phosphate, and anions of C1-C10 organic acids.

3. The drilling fluid of claim 2, wherein the phospholipid compound includes one or more fatty alkyl propylene glycol dimonium phosphate salts, where the fatty alkyl is a C6-C25 alkyl group.

4. The drilling fluid of claim 1, wherein the weighting agent is a solid weighting agent.

5. The drilling fluid of claim 1, wherein the weighting agent is a water soluble salt selected from at least one of alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations thereof.

6. The drilling fluid of claim 1, further comprising at least one of a viscosity agent, fluid loss control agent, bridging agent, anti-bit balling agent, corrosion inhibition agent, alkali reserve material buffering agents, surfactants and suspending agent, and/or a rate of penetration enhancing agent.

7. A method of drilling a subterranean formation utilizing an aqueous based drilling fluid, wherein the drilling fluid comprises:
an aqueous base fluid;
a weighting agent;
a phospholipid compound of the following formula:

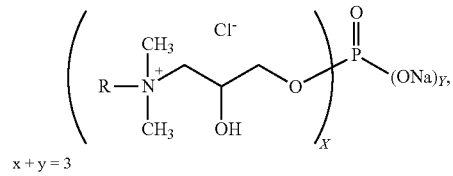

Structure 1

$x + y = 3$ wherein: R is a C6-C25 hydrocarbon group; and wherein when in formulation the counterions present in the phospholipid may exchange with counterions of other ingredients.

8. The method of claim 7, wherein the weighting agent is a salt selected from the group consisting of alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations thereof.

9. The method of claim 7, wherein the drilling fluid further includes a solid weighting agent.

10. The method of claim 7, wherein the drilling fluid further comprises at least one of a viscosity agent, fluid loss control agent, bridging agent, anti-bit balling agent, corrosion inhibition agent, alkali reserve material buffering agents, surfactants and suspending agent, and/or a rate of penetration enhancing agent.

11. The drilling fluid of claim 1, wherein the phospholipid, in formation, is of the following formula:

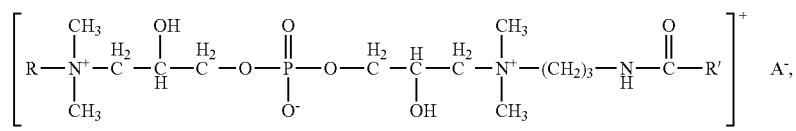

Structure 2 wherein R and R' are independently $C_6$-$C_{25}$ hydrocarbon groups and A is a counterion.

12. The drilling fluid of claim 11, wherein A is a strong inorganic acid or organic acid.

13. The drilling fluid of claim 11, wherein the counterion is selected from the group consisting of halide, nitrate, sulfate, phosphate, anions of $C_1$ to $C_{10}$ organic acids, and combinations thereof.

* * * * *